United States Patent [19]
Hill et al.

[11] Patent Number: 5,924,097
[45] Date of Patent: Jul. 13, 1999

US005924097A

[54] BALANCED INPUT/OUTPUT TASK MANAGEMENT FOR USE IN MULTIPROCESSOR TRANSACTION PROCESSING SYSTEM

[75] Inventors: Michael James Hill, Vadnais Heights; Thomas Pearson Cooper, New Brighton; Dennis Richard Konrad, Welch; Thomas L. Nowatzki, Shoreview, all of Minn.

[73] Assignee: Unisys Corporation, Blue Bell, Pa.

[21] Appl. No.: 08/996,761

[22] Filed: Dec. 23, 1997

[51] Int. Cl.$^6$ .................................................. G06F 15/173
[52] U.S. Cl. .................................... 707/10; 707/2; 707/8; 707/201; 395/200.38; 395/200.43; 395/675
[58] Field of Search ............................. 707/10, 8, 2, 201; 395/675, 200.43, 200.38

[56] References Cited

U.S. PATENT DOCUMENTS

| | | | |
|---|---|---|---|
| 5,120,944 | 6/1992 | Kern et al. ................................ | 235/379 |
| 5,193,162 | 3/1993 | Bordsen et al. ......................... | 395/425 |
| 5,450,584 | 9/1995 | Sekiguchi et al. ....................... | 395/650 |
| 5,668,986 | 9/1997 | Nilsen et al. ............................. | 707/10 |
| 5,675,791 | 10/1997 | Bhide et al. .............................. | 395/621 |
| 5,706,511 | 1/1998 | Tomoda .................................... | 395/621 |
| 5,761,505 | 6/1998 | Golson et al. ............................ | 395/653 |

OTHER PUBLICATIONS

Rishie, et al., "Load balancing in a massively parallel semantic database", Computer Systems Science and Engineering, vol. 11, No. 4, abstract only, Jul. 1996.

Rahm E., "Dynamic load balancing in parallel database systems", Euro–Par '96 Parallel Processing Second International Euro–Par Conference Proceedings, vol. 1 of vol. 2, Abstract only, Aug. 1996.

Bernstein et al., "Implementing recoverable request using queues", Proceedings of the 1990 ACM SIGMOD International Conference on Management of Data, SIGMOD Record, vol. 19, No. 2, abstract only, May 1990.

*Primary Examiner*—Paul V. Kulik
*Assistant Examiner*—Jean R. Homere
*Attorney, Agent, or Firm*—Charles A. Johnson; Mark T. Starr; Merchant, Gould, Smith, Edell, Welter and Schmidt

[57] ABSTRACT

A system and method for balancing database transaction request distribution between various hosts in a multiprocessor transaction processing system is provided. The transaction processing system includes a database and multiple host processors each coupled to at least one database transaction request unit. Database transaction requests sent from the host processors are collectively entered into a commonly-accessible load balancing queue. Each database transaction request is accompanied by a source identifier that identifies the database transaction request unit which initiated the corresponding database transaction request. The queued database transaction requests from the load balancing queue are processed by currently-available host processors, regardless of which host processor initiated the database transaction request. A transaction request acknowledgment for each of the processed transaction requests is created and transferred to the database transaction request unit identified by their respective source identifiers.

24 Claims, 6 Drawing Sheets

5,924,097

BALANCED INPUT/OUTPUT TASK MANAGEMENT FOR USE IN MULTIPROCESSOR TRANSACTION PROCESSING SYSTEM

FIELD OF THE INVENTION

This invention relates generally to computer input/output (I/O) systems, and more particularly to a system and method for balancing and maximizing efficiency of database transaction request distribution between various hosts in a multiprocessing computer system.

BACKGROUND OF THE INVENTION

Many computing systems today utilize multiple processing units, resulting in a computer architecture generally referred to as multiprocessing. Multiprocessing systems are often used for transaction processing, such as airline and banking systems. Transaction processing refers generally to a technique for organizing multi-user, high volume, on-line applications that provides control over user access and updates of databases. A transaction refers to the execution of a retrieval or an update program in a database management system. Transactions originating from different users may be aimed at the same database records. This situation, if not carefully monitored, may cause the database to become "inconsistent". Where all transactions are executed one after the other, the database will remain in a consistent state. However, in a multiprocessing computing system, such serial I/O transaction execution may be wasteful of processing resources, as some host processors may be idle while another has multiple I/O requests queued.

In order to alleviate the wasting of processing resources, some prior art systems have implemented "interleaving" functionality, where the execution of transactions leaves the database in a consistent state. One way of preserving data consistency is to ensure that the interleaved transactions are equivalent to executing the transactions serially, which is referred to as serializable execution. This has been performed in the prior art by "locking" certain actions to be performed on a data item. In other words, a transaction may request that a data item be locked from being accessed or modified by other transactions, which results in the serialization of execution.

However, locking techniques may be complex, and can lead to problems such as "deadlock", where two transactions are waiting for each other to release locks and both cannot proceed. Furthermore, these prior art systems do not efficiently utilize processing resources in multiprocessing systems. For example, in some prior art systems, a host processor that received a request message from an I/O terminal was the same host that performed the corresponding database transaction. Therefore, all I/O requests are handled by "local" host processors, where "local" refers to those I/O requests made from I/O processors which are directly coupled to a particular host processor. For example, all I/O requests to or from a first I/O processor could be serviced by a first host processor, and could not be handled by remote host processors which are not directly coupled to the first I/O processor. In addition, where a failure occurs on any given host processor in the system, processing cannot continue for the pending I/O requests corresponding to that host processor until recovery is complete.

While I/O requests could be "passed" from a receiving local host to remote hosts, the overhead associated with such request routing is prohibitively complex and time consuming. Although data consistency can be preserved with some prior art request passing and/or locking techniques, they lack the efficiency and speed desired in I/O computing systems. Furthermore, some processing units in these prior art computing systems may be idle while others vigorously strive to sustain the demand for input/output.

The present invention allows a host processor, which is different than the host that receives the request message from a terminal, to perform the database transaction. This allows available host processors to share I/O tasks received at other host processors in the multiprocessing system, without requiring I/O request messages to be sent between various host processors. The present invention allows for the sharing of host processing resources for input/output transactions, thereby increasing overall system speed and reducing serialization complexities. The present invention therefore provides a solution to the aforementioned and other problems, and offers other advantages over the prior art.

SUMMARY OF THE INVENTION

The present invention relates to a system and method for balancing and maximizing efficiency of database transaction request distribution between various hosts in a multiprocessing computer system.

In accordance with one aspect of the invention, a method for balancing database transaction request distribution in a transaction processing system is provided. The transaction processing system includes a database and multiple host processors each coupled to at least one database transaction request unit. In one embodiment of the invention, database transaction requests which are sent from the host processors are collectively entered into a commonly-accessible load balancing queue. Each database transaction request is accompanied by a source identifier that identifies the database transaction request unit which initiated the corresponding database transaction request. The queued database transaction requests from the load balancing queue are processed by those of the host processors which are currently available, regardless of which host processor initiated the database transaction request. A transaction request acknowledgment for each of the processed transaction requests is created and transferred to the database transaction request unit identified by their respective source identifiers. A variation of this embodiment of the invention includes processing database transaction requests that are related using a common host processor, such that a particular host processor processes all of the related database transaction requests.

In accordance with another aspect of the invention, a multiprocessor system for managing database transaction requests from a plurality of input/output (I/O) devices is provided. In one embodiment of the invention, a plurality of host processing units are each coupled to at least one of the I/O devices to receive the database transaction requests from their associated I/O devices. A task management system is coupled to each of the host processing units to process the database transaction requests. The task management system includes a load balancing queue that is commonly coupled to all of the host processing units to collectively queue the aggregate of the database transaction requests. The task management system further includes an input message queues for each of the host processing units in the system. Each input message queue is coupled to the load balancing queue, to allow an available host processing unit to transfer the database transaction request at the top of the load balancing queue to its corresponding input message queue to be processed by that available host processing unit.

Still other objects and advantages of the present invention will become readily apparent to those skilled in this art from the following detailed description, where the preferred embodiment of the invention is shown by way of illustration of the best mode contemplated of carrying out the invention. As will be realized, the invention is capable of other and different embodiments, and its details are capable of modification without departing from the invention. Accordingly, the drawing and description are to be regarded as illustrative in nature, and not as restrictive.

DETAILED DESCRIPTION OF THE ILLUSTRATED EMBODIMENTS

Figure 1:
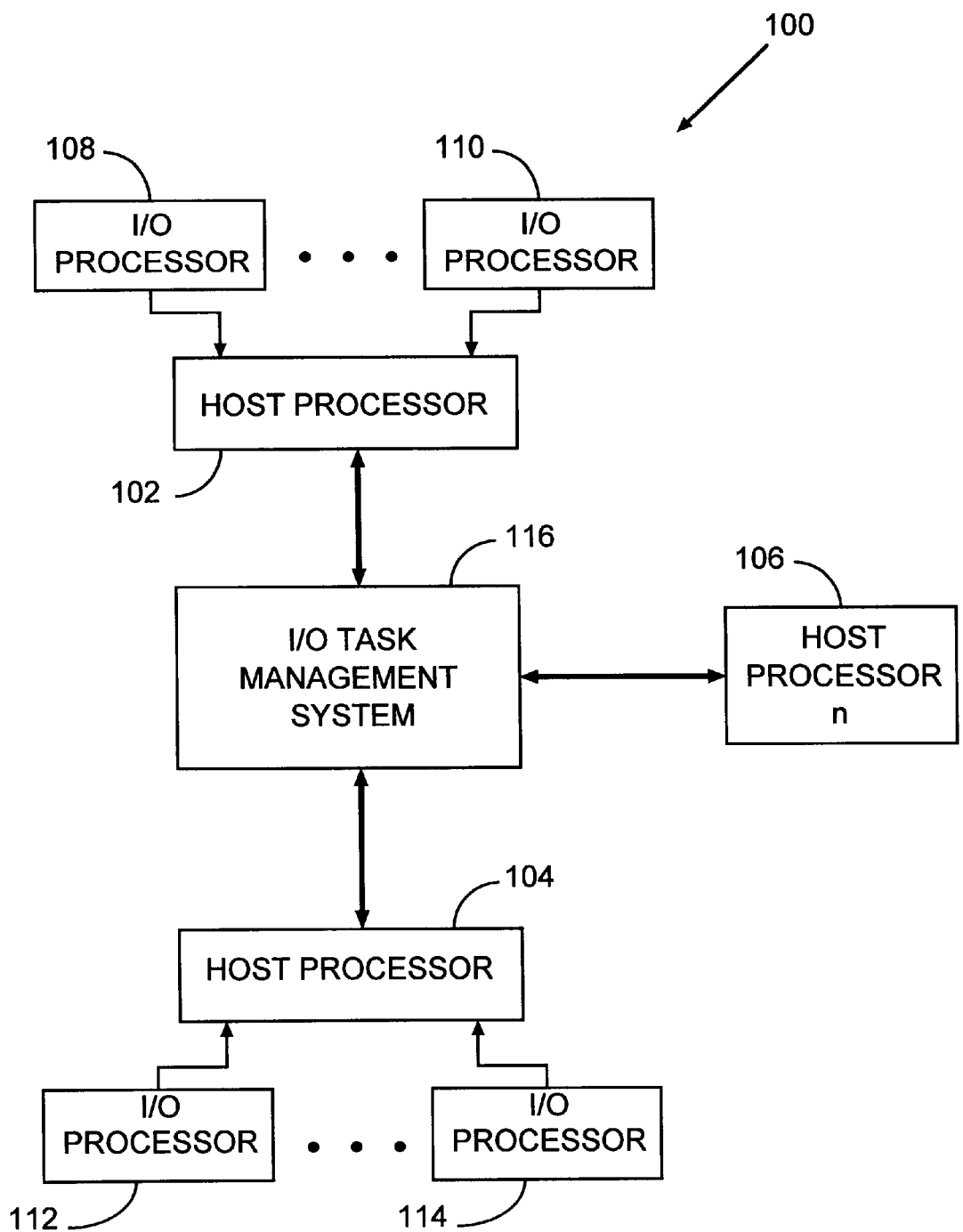
FIG. 1 is a is a block diagram of one embodiment of a multiprocessing computing system providing I/O task management in accordance with the present invention.

FIG. 1 is a is a block diagram of one embodiment of a multiprocessing computing system 100 providing I/O task management in accordance with the present invention. Multiprocessing generally refers to the operation of more than one processing unit within a single system. Multiple host processors may operate in parallel to enhance speed and efficiency. Separate processors may also take over communications or peripheral control, for example, while the main processor continues program execution. A host processor generally refers to the primary or controlling computer in a multiple computer network. In the multiprocessing computing system 100 of FIG. 1, each of a plurality of multiple host processors 102, 104 through host processor n 106 are coupled together to create a robust multiprocessing system. Each of the host processors typically includes memory, and may actually be comprised of multiple instruction processors (IPs) to create an aggregate host processing function.

In order to more efficiently control input and output functions, each of the host processors is interfaced to input/output (I/O) processors, which perform functions necessary to control I/O operations. The I/O processors relieve host processors from having to execute most I/O-related tasks, thereby allowing host processing functions to be expedited. In FIG. 1, any number of I/O processors may be coupled to a particular host processor. For example, host processor 102 is coupled to n processors, illustrated by I/O processors 108 to 110. Similarly, host processor 104 is shown coupled to a plurality of I/O processors 112, 114, and host processor n 106 is depicted as a stand-alone processor having no interfaced I/O processors.

It is often the case that a particular one of the I/O processors 108–114 is more active than others due to a high level of I/O, resulting in the corresponding host processor having to manage more I/O requests than other host processors. The present invention balances the I/O load by allowing idle host processors to manage I/O requests from remote I/O processors. In one embodiment of the invention, this load balancing is accomplished via the I/O task management system 116, which interfaces to each of the host processors 102, 104, 106 in the multiprocessing computing system 100.

In one embodiment of the invention, the I/O task management system 116 provides a centralized first-in first-out (FIFO) in a non-volatile cache memory to distribute I/O requests to one of the multiple hosts in the system. Another FIFO returns responses to the I/O requests in the form of output messages to the requesting user terminal using one of the multiple hosts which may be coupled to that terminal. Because the host processor that receives the input request message does not necessarily have to process the request, load balancing can occur. Furthermore, this allows hosts to be specialized, such that some hosts can be designated as back-end processors, whereas other hosts may be front-end processors. This results in increased performance and efficiency, as will be described more fully below.

Figure 2:
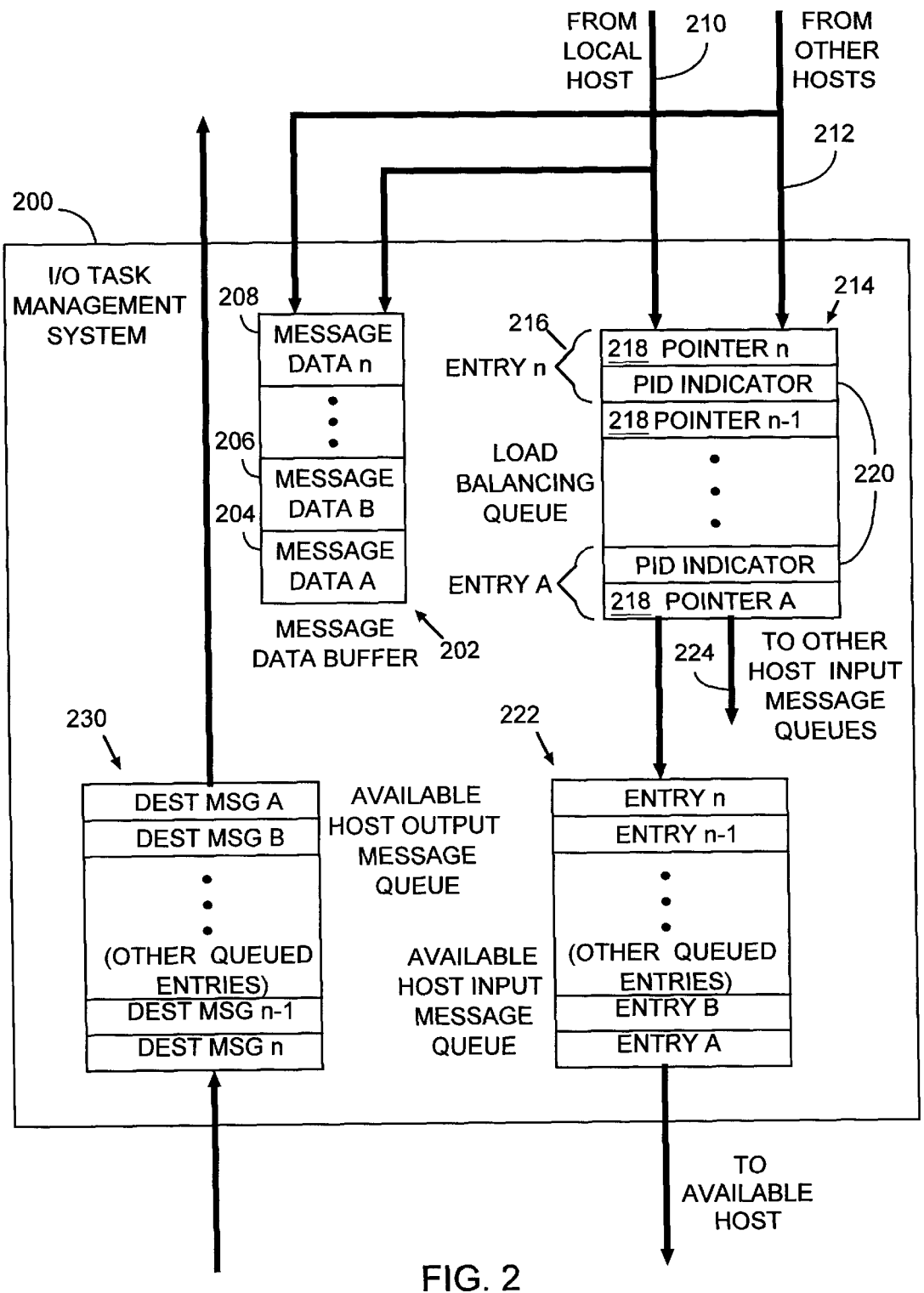
FIG. 2, one embodiment of an I/O task management system in accordance with the present invention.

Referring now to FIG. 2, one embodiment of an I/O task management system 200 is provided, for use in a system such as the multiprocessing computer system 110 of FIG. 1. When a host receives an input I/O request, it is typically received in the form of a message from a user terminal. This message, referred hereinafter as a "source message", contains message data, and a Process Identification (PID) indicator which identifies the user terminal. In a transaction application environment, there may be several instances of the communications software, wherein each instance services a subset of the network terminal workstations which have sessions with the application. A session is a logical connection between any two addressable units in the system, and the PID indicator identifies the terminal session that provided the source message.

An instance of the communications software which is operating on the receiving host performs handshaking operations for the source message, and will pass the message data to the I/O task management system 200 where it is loaded into the message data buffer 202. The message data buffer 202 can hold multiple message data packets as seen by message data A 204, message data B 206 through message data n 208. Entries can be made into the message data buffer 202 from either local hosts and remote hosts, as indicated by lines 210 and 212 respectively.

An entry is loaded into a common load balancing queue 214 for every message data packet stored in the message data buffer 202. Each entry 216 includes a pointer 218 to the message data buffer 202, and also includes the PID indicator 220. The pointer is an address of the data packet as it is stored in the message data buffer 202, and the PID indicator identifies the terminal which provided the source message. As seen by lines 210 and 212, the common load balancing queue 214 contains entries 216 for source messages received from all hosts in the system, whether local or remote hosts.

The entries 216 in the load balancing queue 214 can be processed by any available host processor in the multiprocessing computer system. Each of the host processors has a corresponding input message queue and output message queue in the I/O task management system 200. When a particular host is available, the next entry in the load balancing queue 214 is queued into the available host's corresponding host input message queue 222 to await processing by the available host. Each host has a dedicated input message queue coupled to the load balancing queue 214, as illustrated by line 224, and each host processes the I/O requests in its own input message queue. The PID indicator 220 is provided to the host as part of the entry 216 to allow a host transaction program to send a destination output message back to the originating user terminal which indicates to the originating user terminal that the I/O request has completed successfully. PID indicators are described in greater detail in connection with FIG. 6.

When message processing of an I/O request has been completed by an available host, the host creates a destination message which is added to its host output message queue 230 for the same instance of the communications program that handled the original source message. The communications program instance then sends the destination message to the terminal session indicated by the PID indicator associated with the destination message.

From the foregoing description, it can be seen that I/O requests from all (or preselected ones) of the I/O processors are commonly queued at the load balancing queue 214. The corresponding source messages are appropriately distributed among the various dedicated host input message queues 222 to await processing by their respective host processors. The PID indicator 220 is provided with the entry to allow the host processor to provide a destination message to its host output message queue 230, and ultimately to the originating terminal session identified by the PID indicator. This allows the total I/O request load of the multiprocessing computer system to be balanced with respect to I/O request processing obligations at each host processor.

Figure 3:
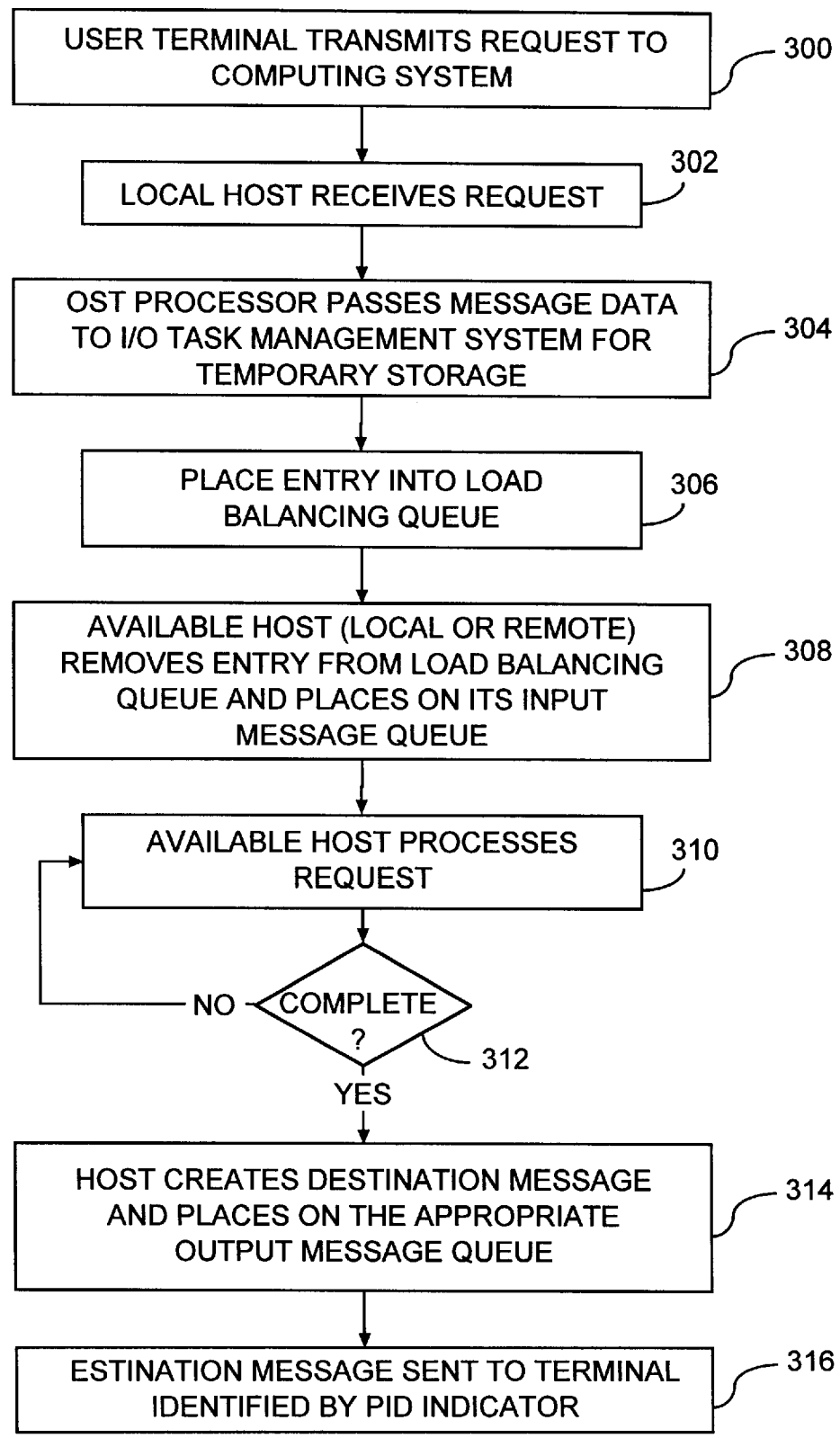
FIG. 3 is a flow diagram of one embodiment of the multiprocessor I/O request balancing in accordance with the present invention.

Referring now to FIG. 3, a flow diagram of an embodiment of the multiprocessor I/O request balancing in accordance with the present invention is provided. When an I/O request is desired from a user terminal, a source message is generated at the user terminal. The user terminal outputs 300 the source message to the computing system to which it is connected. The user terminal is typically coupled to a local host processor via an I/O processor. The local host processor receives 302 the source message, which contains both message data and a PID indicator. Message data is the information which is to be retrieved or updated at the database or other structure or application utilizing the data. The PID indicator identifies the terminal which provided the message. A communications program running on the receiving host performs handshaking for the source message, and passes the source message data to the I/O task management system to be temporarily stored in a data storage buffer, as illustrated at block 304. Several instances of the same communications program may be running on the same host depending on user demand. An entry containing a pointer to the message data is then queued 306 in the load balancing queue 214. The load balancing queue 214 is a common queue used to manage all source message requests received from any host processor in the system.

An available host, whether local or remote from the I/O processor providing the source message, removes an entry from the load balancing queue 214 and places it on its own input message queue, as illustrated at block 308. The available host processes 310 the request, and when the request is complete 312, creates 314 a destination message which is entered onto its output message queue. In processing the request, the host processor typically performs a transaction to a database which is stored on a disk system. The destination message generated by the transaction is sent 316 to the terminal session indicated by the PID indicator. This is accomplished by mapping the PID indicator to a communications instance operating on the original requesting host, as will be described more fully below.

Figure 4:
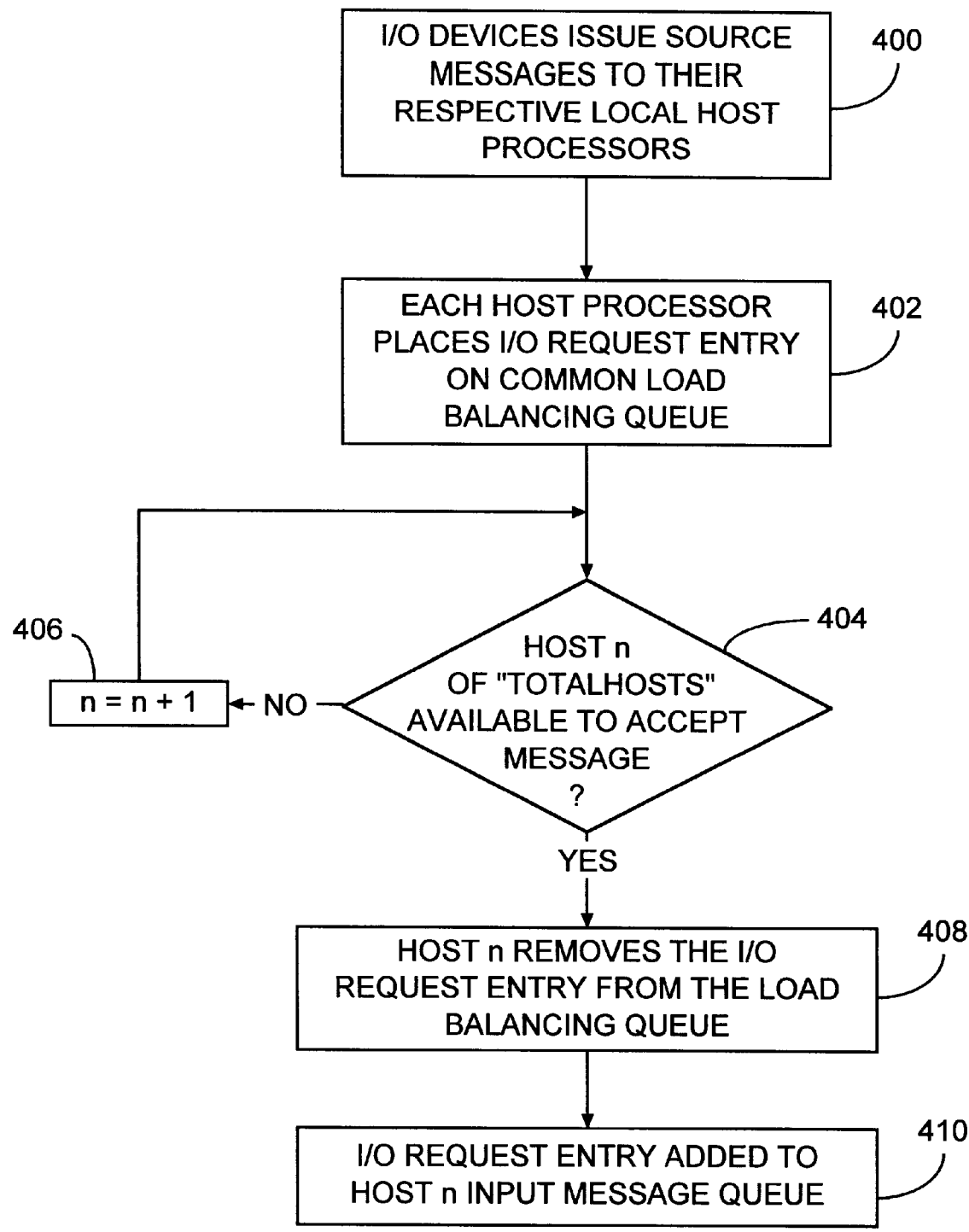
FIG. 4 is a flow diagram of one embodiment of the use of I/O task sharing by multiple hosts using a common load balancing queue in accordance with the present invention.

FIG. 4 is a flow diagram of one embodiment of the use of I/O task sharing by multiple hosts using a common load balancing queue in accordance with the present invention. Source messages embodying I/O requests are issued 400 via I/O devices, such as user terminals, to their respective local host processors. The local host processors which receive the source messages each place 402 an entry on a common load balancing queue. The entry includes a pointer to the source message data, and the PID indicator.

It is then determined which of the host processors in the computing system is available to accept the message. It is determined 404 whether a first host processor (host n) of a total number of hosts (TOTALHOSTS) is available to accept the message. It host n is not available, the next host (host n+1) is examined or queried, as represented by block 406 which illustrates an increment to n. When a particular host is found to be available to accept the message, the available host n removes 408 the source message entry from the load balancing queue, and loads 410 the entry into the host n input message queue.

The system can determine when a host has become available. Each of the host systems which are servicing the load balancing queue 214 includes a dispatcher functionality. When a processor in a multiprocessing system has completed a task, the dispatcher determines what task is to be accomplished next (e.g., storage to disk, execute a transaction program, etc.). The dispatcher also interrogates the load balancing queue 214 for new messages. Therefore, as each host has available processing capacity, it will service more messages. A servicing host with more capacity will service proportionately more messages than another host of lesser capacity.

Use of the centralized load balancing queue therefore allows processing of I/O requests to be distributed evenly throughout the system so that no host is overloaded while another host is idle. System throughput may be further increased by assigning each host a dedicated I/O processing task. For example, hosts A and B can be dedicated as front-end processors (FEPs) for performing all communications between I/O equipment such as user terminals. Hosts C and D can be dedicated as back-end processors (BEPs) for performing the actual transaction processing to a database. This dedication of tasks may result in more efficient use of system resources because a dedicated FEP may not have to support the database management system, whereas a dedicated BEP may not have to support the communications utilities for communicating with terminals.

Figure 5:
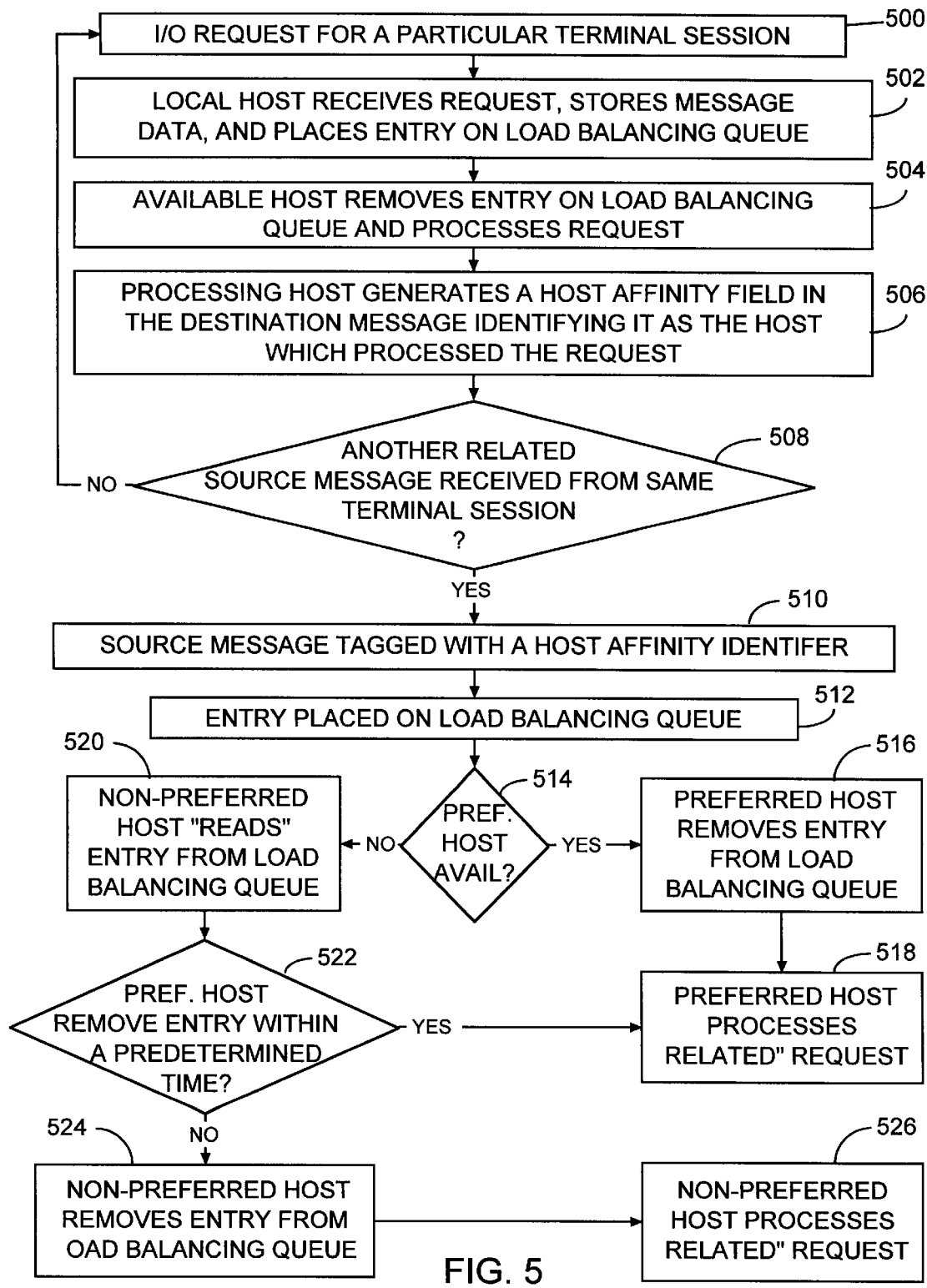
FIG. 5 is a flow diagram of one embodiment of the invention where I/O request sharing is guided such that related I/O requests are handled by one particular host computer.

FIG. 5 is a flow diagram of one embodiment of the invention where I/O request sharing is guided such that related I/O requests are handled by one particular host computer. A single I/O request may consist of multiple related request messages. More efficient processing will generally result if all related messages are handled by a common host computer. This is due to the fact that processing of the related messages usually requires access to a common group of database records. Where the records have already been copied from disk or from a higher level memory (such as cache memory) to a particular host's memory during processing of a previous request message, processing of subsequent related messages by the same host may not require additional database read operations.

In one embodiment of the invention, such a host computer may be allowed preferential access to entries queued on the load balancing queue 214 which are "related" request messages. These entries are assigned a common host affinity indication (hereinafter "host affinity identifier") in a host affinity field. The process begins with an I/O request 500 from an I/O device for a particular terminal session. The local host receives the request, stores the message data in the message data buffer 202, and places the entry on the load balancing queue 214 as seen generally at step 502. Step 504 illustrates the removal of the entry from the load balancing queue by an available host, and the processing of the request by the available host.

After the available host has processed the request, a host affinity field is generated 506 from information returned in the destination message that identifies the host (hereinafter "host identifier") that processed the message. The host identifier is added to the PID descriptor for the particular terminal session. When another related source message is received 508 from that same terminal session, that source message is tagged 510 with a host affinity identifier, and the entry is placed 512 on the load balancing queue 214. If it is determined 514 that the preferred host is available to process the request, the preferred host removes 516 the entry from the load balancing queue 214, and processes 518 the related request. If the preferred host is not available as determined at step 514, the non-preferred host reads 520 the entry from the load balancing queue 214. The non-preferred host waits a predetermined time for the preferred host to remove the entry for processing, and if the preferred host removes the entry within a predetermined time as seen at step 522, the preferred host processes 518 the related request. In most cases, the preferred host will be available to remove the entry for processing before the predetermined time has elapsed. If this is not the case, the non-preferred host removes 524 the entry, and processes 526 the related request even though the entry is marked as having a host affinity for the preferred host. Thus, in most cases the preferred host (as indicated by the host affinity field) will process 518 all messages related to a given request. In some abnormal cases, however, multiple hosts will process multiple related messages so the processing of a given request is not unduly delayed.

The use of the host affinity field can be illustrated by example, referring to FIGS. 1, 2 and 5. Assume a request to reserve an airline seat is entered on a terminal coupled to an I/O processor such as I/O processor 108 of FIG. 1. A first request may involve a seat reservation, and a second request may be for a special meal selection. Assume a terminal connected to host 102 receives the initial seat request, which is added to the load balancing queue 214, and is eventually processed by host 104. Host 104 reads the required records from the database into its host memory (not shown), updates the records to complete the transaction, and generates a destination message, including the host affinity and a query as to meal selection, which is returned to the user terminal.

When the same user terminal later generates the second related request message for a special meal selection, host 102 stores the request entry on the load balancing queue 214 and marks the entry has having a "host 104 affinity". This request can be processed most efficiently by host 104 since the required database records are already resident in the host memory of host 104. When this entry reaches the top of the load balancing queue 214, another host, such as host processor 106 of FIG. 1, may attempt to remove the entry before host 104 attempts to do so. Host 106 will not remove the entry from the load balancing queue 214 because of the host 104 affinity designation. The load balancing queue 214 will hold the entry for a predetermined amount of time so that host 104 has an opportunity to remove the entry from the load balancing queue 214 for processing. Host 106 will only process this entry if host 104 has not removed the entry after the predetermined time has elapsed.

Figure 6:
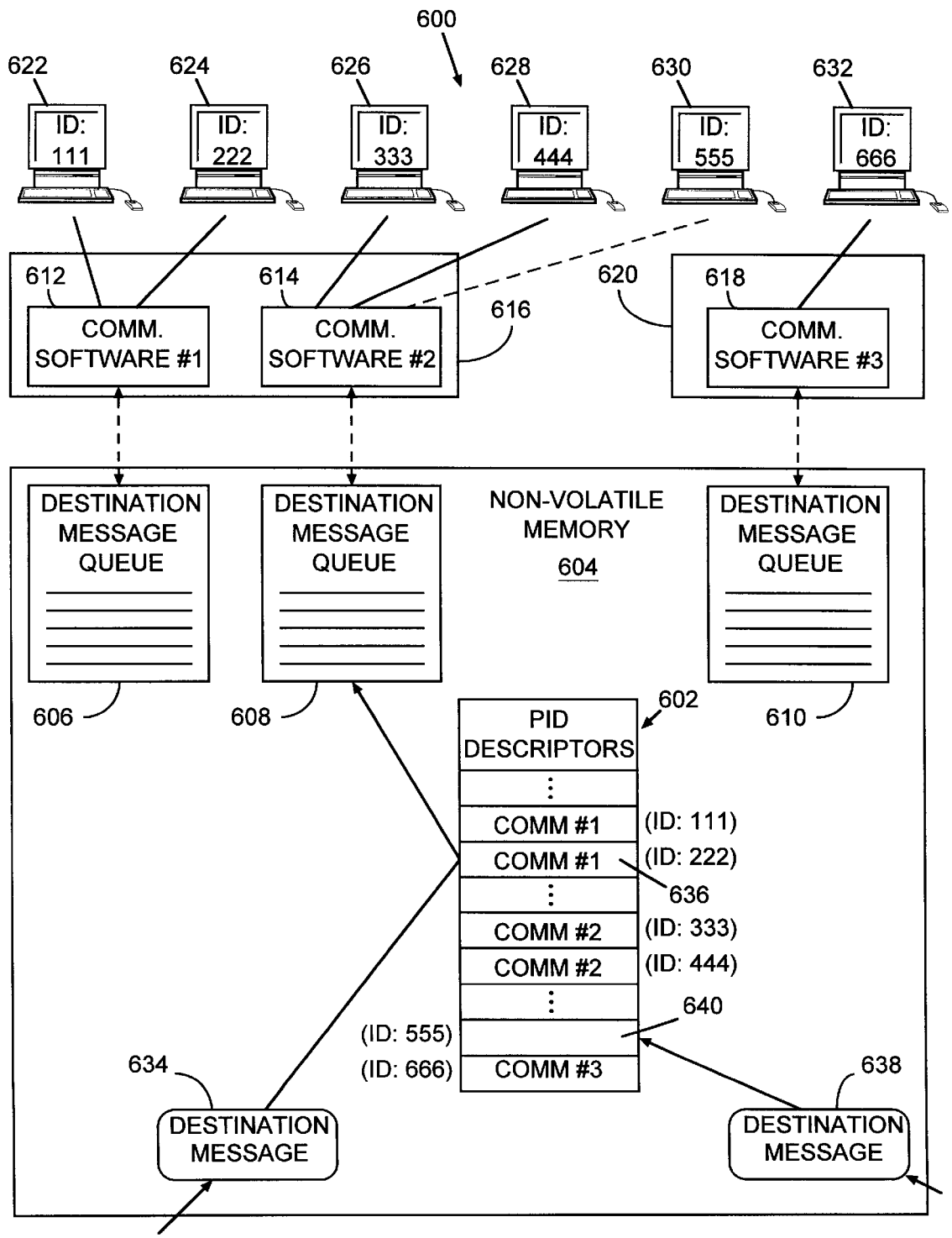
FIG. 6 is a block diagram of one embodiment of a multiprocessing computer system utilizing common PID descriptor routing.

Referring now to FIG. 6, a block diagram of one embodiment of a multi-host and multiprocessing computer system 600 utilizing PID descriptor routing is provided. Prior art multi-host systems maintained dedicated host memory tables at each host for the network terminals which it was servicing. Therefore, transactions running on any given host could only send output destination messages to terminals having sessions on that same host. Furthermore, if any particular one host failed, any in-progress source or destination messages for its terminal sessions are "orphaned" until the failed host recovers itself, and the terminal sessions are re-established with the recovered host. This results in the inability of terminal sessions to a multi-host application to move their sessions to different hosts without potentially causing lost or duplicate transactions and destination messages. The same situation arises if a terminal session is closed; any in-progress messages are orphaned until the terminal session is re-opened to that same host. The use of PID indicators and PID descriptor structures in accordance with the present invention allow destination messages to be sent from transactions on any host to terminal sessions on any host, and also guard against lost or duplicate transactions and messages in the event of a host failure or a terminal session being temporarily closed and re-opened to a different host.

In the embodiment illustrated in FIG. 6, the PID indicators are commonly stored in a data structure referred to as the PID descriptors 602. The PID descriptors 602 are provided in a non-volatile memory 604, which also includes destination message queues 606, 608 and 610. A destination message queue is provided for each instance of the corresponding communications software module, shown as communications software modules 612 and 614 in host A 616, and communications software module 618 in host B 620. Multiple workstations 622, 624, 626, 628, 630 and 632 represent user terminals for initiating I/O requests, and in the present example correspond to terminal identification numbers 111, 222, 333, 444, 555 and 666 respectively.

Whenever a terminal session is opened to an instance of the communications software, a PID indicator for that terminal identification is created in the non-volatile memory 604. The PID indicator within the PID descriptors 602 includes a pointer to the destination message queue associated with the requesting communications software. As on-line transactions are completed, destination messages are created and automatically routed to the servicing communications software, via the PID descriptors 602, for delivery to the terminal workstation. For example, a destination message 634 generated from a particular transaction executed for workstation 624 having a terminal identification number of 222 is routed to communications software module 612, as identified by the PID descriptor entry 636. Using this common mapping scheme, the PID descriptors 602 allow destination messages to be sent from transactions on any host to terminal sessions on any host.

Further, if a terminal session is not currently active when the transaction completes, the destination message is temporarily queued to the PID descriptor 602 until the terminal session is re-established. For example, destination message 638 is queued at PID descriptor entry 640 until the requesting communications software module is re-established to indicate which destination message queue the destination message should be queued in. During terminal session re-establishment, any orphaned destination messages which are temporarily queued to the PID descriptors 602 are therefore forwarded to the requesting communications software's destination message queue. For example, if workstation 630 opens a session with communication software module 614, PID descriptor entry 640 is updated to point to communications software module 614, and the temporarily queued destination message is forwarded to destination message queue 608 for delivery to workstation 630. Therefore, there is no need for concern of lost and duplicate transactions and messages, since a transaction completion providing a destination message to an inactive terminal session results in structured temporary storage in the PID descriptors 602, and the destination messages are automatically routed to the appropriate terminal session upon re-establishment of the terminal session.

The invention has been described in its presently contemplated best mode, and it is clear that it is susceptible to various modifications, modes of operation and embodiments, all within the ability and skill of those skilled in the art and without the exercise of further inventive activity. Accordingly, what is intended to be protected by Letters Patents is set forth in the appended claims.

What is claimed is:

1. A method for balancing database transaction request distribution in a transaction processing system having a database, and a plurality of host processors each coupled to one or more database transaction request units, the method comprising:

collectively entering database transaction requests sent from each of the host processors into a commonly-accessible load balancing queue, wherein each database transaction request is accompanied by a source identifier identifying the database transaction request unit that initiated the corresponding database transaction request;

processing queued database transaction requests from the commonly-accessible load balancing queue by available ones of the host processors;

creating a transaction request acknowledgment for each of the queued database transaction requests which are processed; and transferring the transaction request acknowledgments to the database transaction request unit identified by their respective source identifiers.

2. The method as in claim 1, further comprising processing related database transaction requests using the host processor which processed a first of the related database transaction requests.

3. The method as in claim 2, wherein processing related database transaction requests comprises:

including a host affinity identifier, which identifies the host processor which processed the first of the related database transaction requests, with the transaction request acknowledgment;

providing the host affinity identifier with a subsequently transmitted database transaction request from the host processor which issued the first of the related database transaction requests;

entering the subsequently transmitted database transaction request on the load balancing queue; and assigning the subsequently transmitted database transaction request to the host processor identified by the host affinity identifier when the host processor identified by the host affinity identifier is available.

4. The method as in claim 3, further comprising:

retaining the subsequently transmitted database transaction request on the load balancing queue for a predetermined time; and allowing the host processor identified by the host affinity identifier to process the subsequently transmitted database transaction request if the host processor identified by the host affinity identifier is available within the predetermined time.

5. The method as in claim 3, further comprising processing the subsequently transmitted database transaction request by any of the host processors which is available when the host processor identified by the host affinity identifier is not available.

6. The method as in claim 3, wherein the related database transaction requests comprise the database transaction requests associated with a common terminal session.

7. The method as in claim 1, wherein collectively entering database transaction requests comprises entering the database transaction requests from all of the database transaction request units onto the commonly-accessible load balancing queue in a first-in-first-out fashion.

8. The method as in claim 1, wherein collectively entering database transaction requests comprises entering the database transaction requests from all of the database transaction request units onto a non-volatile, centralized first-in-first-out storage device accessible to each of the host processors.

9. The method as in claim 1, wherein creating a transaction request acknowledgment comprises generating a completion status code indicating whether the database transaction was successful.

10. The method as in claim 1, further comprising queuing the transaction request acknowledgment in one of a plurality of output queues corresponding to a communication software module that initiated the database transaction request, wherein the communication software modules each interface one or more of the database transaction request units the corresponding output queue.

11. The method as in claim 10, wherein transferring the transaction request acknowledgments comprises providing an address to the output queues using the source identifier corresponding to the database transaction request unit that initiated the database transaction request.

12. The method as in claim 11, wherein providing an address comprises locating the address of a particular one of the output queues in a memory structure addressable via the source identifiers.

13. The method as in claim 1, wherein processing queued database transaction requests comprises;

removing the database transaction request next in the load balancing queue; and updating the database in accordance with the database transaction request.

14. The method as in claim 1, wherein processing queued database transaction requests comprises processing the queued database transaction requests using a different one of the host processors than the host processor that issued the queued database transaction request.

15. The method as in claim 1, wherein processing queued database transaction requests by available ones of the host processors further comprises examining the queued database transaction requests on the load balancing queue by a particular one of the host processors upon its completing a current processing task.

16. The method as in claim 1, further comprising designating selected ones of the host processors to execute functionally-related ones of the queued database transaction requests.

17. The method as in claim 1, further comprising transferring the source identifier concurrently with each of the database transaction requests sent from a particular one of the host processors, wherein the source identifier comprises a digital code corresponding to the transaction request unit issuing the database transaction request.

18. A multiprocessor system for managing database transaction requests from a plurality of input/output (I/O) devices, comprising:

a plurality of host processing units each coupled to at least one of the plurality of I/O devices to receive the database transaction requests;

a task management system coupled to each of the plurality of host processing units to process the database transaction requests from the plurality of host processing units, the task management system comprising:

a load balancing queue coupled to each of the host processing units to collectively queue the database transaction requests from each of the plurality of host processing units;

a plurality of input message queues, each coupled to a respective one of the host processing units and to the load balancing queue; and wherein an available one of the host processing units transfers a next available one of the database transaction requests from the load balancing queue to its corresponding input message queue for processing by the available host processing unit.

19. The multiprocessor system as in claim 18, wherein the load balancing queue comprises a non-volatile memory queue.

20. The multiprocessor system as in claim 18, wherein the plurality of input message queues each comprise a non-volatile memory queue.

21. The multiprocessor system as in claim 18, wherein the load balancing queue comprises a plurality of storage entry fields to receive the database transaction request and a source indicator which identifies the terminal session that provided the database transaction request.

22. The multiprocessor system as in claim 21, wherein the storage entry field comprises a first field to store a pointer to the database transaction request and a second field to store the source indicator.

23. The multiprocessor system as in claim 18, further comprising a plurality of output message queues, one for each of the plurality of host processing units, to queue transaction acknowledgment messages destined for the I/O device which initiated the database transaction request as identified by a source indicator.

24. The multiprocessor system as in claim 23, further comprising a source indicator memory structure coupled to each of the output message queues to store pointers to the output message queues, and wherein the source indicator memory structure is addressable via the source identifiers provided within the transaction acknowledgment messages.

* * * * *